Sept. 17, 1963   E. A. PREUSS   3,104,390
COURSE DIRECTOR
Filed Aug. 4, 1961

INVENTOR
Ernest A. Preuss

BY Mead, Browne, Schuyler & Beveridge
ATTORNEY

United States Patent Office 3,104,390
Patented Sept. 17, 1963

---

3,104,390
COURSE DIRECTOR
Ernest A. Preuss, West Orange, N.J., assignor to Aircraft Radio Corporation, Boonton, N.J., a corporation of New Jersey
Filed Aug. 4, 1961, Ser. No. 129,304
19 Claims. (Cl. 343—107)

This invention relates to aircraft course directors for producing an indication to the pilot to guide him in directing the aircraft to intercept and track a radio beam. It particularly concerns an improved computor for producing a modified heading signal in response to a heading deviation signal corresponding to the displacement of the heading of the aircraft from the bearing of the radio beam.

An aircraft course director of the type to which the invention is applicable is disclosed in United States Patent No. 2,932,023, issued April 5, 1960, to Aircraft Radio Corporation, assignee, on an application of Robert Haskins, filed August 4, 1955. As described in that patent, an indicator such as a cross pointer meter is operated by a comparison of a signal corresponding to the displacement of the aircraft from the desired track of the radio beam and a signal corresponding to the deivation of the heading of the aircraft with respect to the radio beam with one of the signals modified by a proportionality factor varying with the period of changes in one or the other signals and also modified to reduce the proportionality factor for relatively small angles of heading deviation and increasing the proportionality factor for larger angles. In this way, when the aircraft is displaced from the radio beam, it will be directed along a course to intercept the beam. As it approaches the beam, the response to the heading deviation will be reduced so the approach will be asymptotic. However, the modified heading deviation angle will still be adequate to compensate for cross wind while permitting an asymptotic approach to the desired track.

It is a major object of this invention to provide a computor for use in a course director such as shown in said Patent No. 2,932,023 which is of simplified design, lighter in weight, more economical to produce, and, because of its reduced number of components, more reliable.

In the attainment of this object an important feature of the invention resides in the use of voltage sensitive devices, preferably a Zener diode, to control the output of the computor where the heading deviation signal at the input exceeds a selected transition angle. More particularly, a control resistance considerably larger than the output resistance is utilized to attenuate output signals where the heading deviation input signals are relatively small. Shunting the control resistance is a Zener diode having a breakdown voltage corresponding to a heading deviation signal for a selected transition angle. An angle of about 20° has been found most desirable as a transition angle. To maximize changes in the output signal in response to short changes in the heading deviation signal, a capacitor is connected in parallel with the control resistor and the Zener diode so the network has a time constant in the neighborhood of ten seconds. Since the polarity of the signal voltage may be positive or negative, a second Zener diode may be connected back-to-back with the other Zener diode and operate on signals of opposite polarity.

Other objects, advantages and features of the invention will become apparent from the following specification taken in conjunction with the accompanying drawings wherein.

Figure 1:
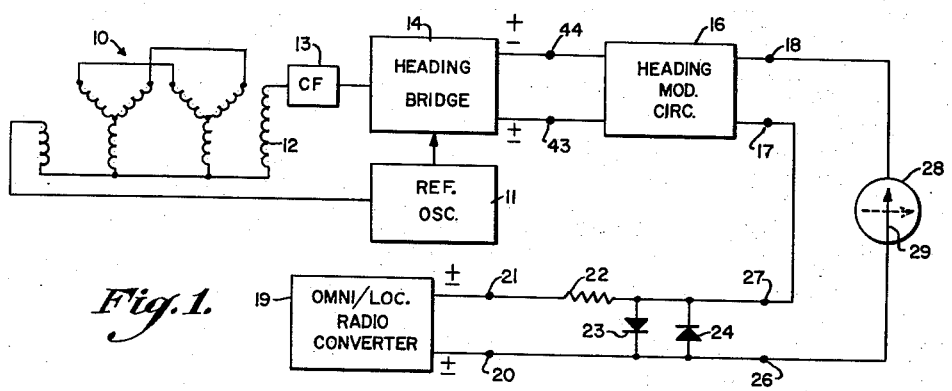
FIG. 1 is a schematic block diagram of a course director embodying the invention.

As shown in FIG. 1, a heading displacement signal is derived from a synchro system 10, excited from a source of reference voltage 11, to produce an alternating current voltage varying in phase and magnitude according to the deviation of the heading of the vehicle from a selected heading preset into the system and corresponding to the definite heading of the radio beam. This signal is developed across winding 12 of the synchro system 10 and coupled by coupling circuit 13 to a bridge circuit 14. The coupling circuit 13 may comprise a cathode follower type circuit, amplifier, or the like. Bridge circuit 14 is supplied with an alternating current reference voltage from reference generator 11 to produce a direct current output which is a function of the heading deviation angle having a polarity which is determined by the sign of the deviation. The output of the bridge circuit 14 is applied to a signal modifying circuit 16 to produce a deviation signal having a polarity corresponding to the polarity of the deviation signal developed by the bridge circuit 14 but varying in magnitude governed by the rate of change of the heading deviation voltage with respect to the heading error. The thus modified heading deviation signal appears at output terminals 17 and 18.

Radio converter 19 develops a beam displacement signal in the form of a direct current voltage corresponding in polarity and magnitude to the direction and magnitude of the displacement of the aircraft from a radio beam. This beam displacement signal appears at terminals 20 and 21 of a limiting circuit comprising series resistor 22 and shunt diodes 23 and 24. The thus limited beam displacement signal appears at terminals 26 and 27 and is algebraically added by the cross pointer meter 28 to the modified heading displacement signal appearing at terminals 17 and 18. Due to the automatic adjustment of the rates of change of the heading deviation voltage by the modifying circuit 16, and the beam displacement signal by the limiting action of diodes 23 and 24 and resistor 22, the aircraft will follow an optimum course to capture the beam as long as the vertical pointer 29 of the cross pointer 28 is maintained in its centered position. Likewise, after the aircraft has captured the beam, all that is necessary to maintain the aircraft on the desired track of the beam is to maintain the vertical pointer 29 in the center position.

Figure 2:
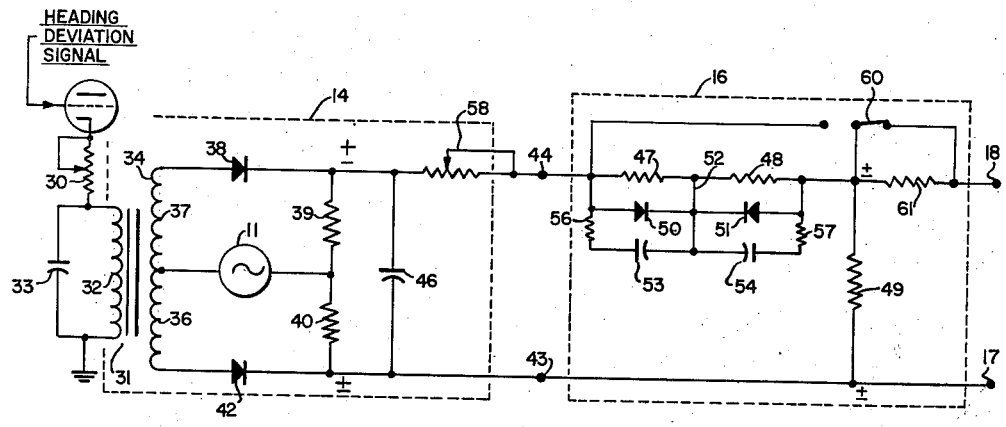
FIG. 2 is an electrical schematic diagram showing a preferred embodiment of the invention incorporated in the system shown in FIG. 1.

As shown in FIG. 2, the cathode circuit of the cathode follower 13 includes a current adjusting potentiometer 30 in series with the tuned primary circuit of transformer 31. The primary winding 32 of transformer 31 is tuned by tuning capacitor 33. Bridge circuit 14 includes the center-tapped secondary winding 34 of transformer 31. One side of reference voltage source 11 is connected to the center-tap of secondary winding 34. Upper winding 37 is connected through diode 38 and resistor 39 to the other side of the reference voltage source 11. Similarly, the lower half 36 of secondary winding 34 is connected through diode 42 and resistor 40 to the other terminal of the reference voltage source 11. The operation of this bridge circuit is conventional in that the reference voltage source 11 causes equal and opposite currents to flow in the two halves 36 and 37 of the secondary winding 34 which are rectified by diodes 42 and 38, respectively, so that equal and opposite voltages are developed across resistors 40 and 39 respectively. Thus, in the absence of a signal in the primary winding 32 of transformer 31, no voltage appears across the output terminals 43 and 44 of the bridge circuit 14. Any signal applied to primary winding 32 induces alternating current voltages in the windings 36 and 37 which are combined with the reference voltages from source 11 to produce direct current voltages of proper polarity and magnitude across resistors 39 and 40. The polarity of the total voltage across resistors 39 and 40 is determined by the phase relationship between the signal applied to primary winding 32 and the reference voltage. A filtering capacitor 46 may be connected in shunt across resistors 39 and 40.

Figure 3:
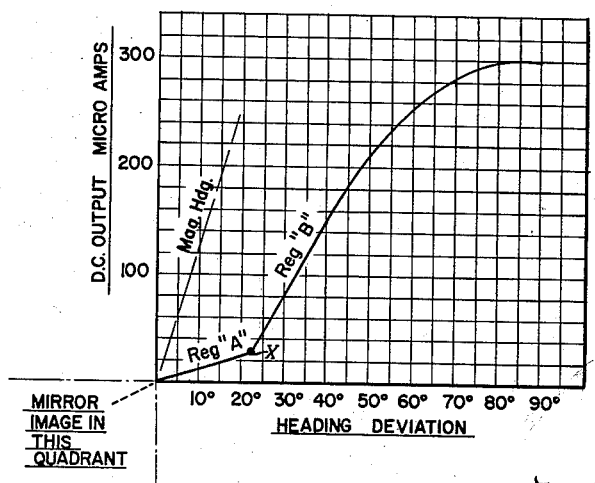
FIG. 3 is a graph showing the relationship of the displacement signal (in micro amperes) to the heading deviation (in degrees).

As indicated, the direct current signal appearing at the output terminals 43 and 44 may be positive or negative depending upon the sign (or direction) of the deviation and is a linear function of the heading deviation signal. The heading deviation signal is proportional to the trigonometric sign of the heading deviating angle. The computer shown in Patent No. 2,932,023, and the computor of the instant invention produce response curves similar to that shown in FIG. 3 wherein the deviation signal is plotted along the abscissa and the modified output is plotted along the ordinant. As shown, the lower left hand quadrant will be a mirror image of the curve shown in the upper right hand quadrant. For heading deviations less than about 20°, the rate of change of the heading deviation voltage with respect to the heading error should be small. That is, the slope of the curve shown in FIG. 3 in the region "A" should be such that the heading deviation voltage at about 20° is about equal to the track deviation voltage at 1° of track deviation. The slope of the curve shown in FIG. 3 is maintained low in the region "A" by a large control impedance comprising resistors 47 and 48 connected in series between the bridge circuit 14 and output resistor 49. The value of resistors 47 and 48 is considerably larger than the value of resistor 49. This will insure a low sensitivity (small slope) for the system for heading deviations less than about 20°.

It will be noted that the transition (point "x" on the curve shown in FIG. 3) from a small slope in the region "A" to a relatively greater slope in the region "B" occurs at a selected transition angle which is approximately 20° as measured in heading deviation angles. Transition from the slope of region "A" to the slope of region "B" is effected by voltage sensitive devices such as Zener diodes 50 and 51, connected in shunt across control resistors 47 and 48. When the voltage developed across these resistors reach a value corresponding to the heading deviation voltage at the transistion angle, the diodes conduct to render control resistors 47 and 48 ineffective and increase the sensitivity of the computer. Diodes 50 and 51 are connected back-to-back so one or the other will be forwardly biased by the deviation voltage, depending upon its polarity, while the other diode will be rendered conductive when the heading deviation voltage reaches the transition point. When both the Zener diodes 50 and 51 conduct, the slope of the curve in the region "B" is considerably greater than the slope of the curve in the region "A." Thus, the rate of change of the heading voltage with respect to the changing deviation angle will be greater when the deviation angle exceeds the selected transition angle.

It will be apparent that with the Zener diodes 50 and 51 poled as they are shown, resistor 47 and diode 50 will have no effect on the heading deviation signal when it is positive since the diode 50 will be forward biased. Similarly, resistor 48 and diode 51 will have no effect on the heading deviation signal when the voltage at terminal 44 is of a negative polarity since diode 51 will be forward biased. For either polarity, resistors 47 and 48 may be combined into a single resistance and the lead 52 eliminated. Under these circumstances, the resistance added to the circuit would equal the resistance of resistance element 47 and 48, which are substantially the same in value. However, diodes 50 and 51 will conduct on either a positive or a negative voltage above the transition angle to shunt out the resistance and increase the sensitivity of the circuit to where the circuit operates in region "B" of the curve shown in FIG. 3.

Normally, the heading changes referred to above are relatively long term changes. Capacitors 53 and 54, connected through resistors 56 and 57 in shunt with control resistors 47 and 48, to form a time lead circuit having a time constant of about ten seconds. The effect of this time lead is to permit momentary heading changes to pass unattenuated when operating on normal heading signals below the selected transition angle. Such momentary changes may be caused, for example, by sudden wind gusts. This feature allows the aircraft heading to be corrected before a bearing error results. As in the case with resistors 47 and 48, capacitors 53 and 54 may be replaced by a single capacitor. When diodes 50 and 51 are conductive, the time lead feature is inoperative since capacitors 53 and 54 are connected in parallel therewith.

Potentiometer 58 adjusts the bridge impedance and hence controls the angle of transition from region "A" to region "B" in FIG. 3.

In operation, the pilot selects a desired heading corresponding to the definite heading of the radio beam and adjusts the synchro system 10 accordingly. This heading voltage is developed across synchro winding 12 and coupled by a coupling circuit 13 to the heading bridge 14. Bridge circuit 14 converts this alternating current signal into a direct current voltage which is a function of the heading deviation angle having a polarity which is determined by the sign of the deviation. This deviation voltage appears across terminals 43 and 44 and is applied to the modifying circuit 16. Zener diodes 50 and 51 are selected to have a Zener voltage corresponding to the selected transition angle (about 20°). When the voltage appearing across terminals 43 and 44 is below the voltage corresponding to the selected transition angle, resistor 47 or 48 will attenuate the signal. If the heading deviation voltage at terminals 43 and 44 increases beyond the value corresponding to the selected transition angle, then Zener diode 50 or 51, depending upon whether the polarity of the signal at terminals 44 and 43 is positive or negative, will conduct so that both control resistors 47 and 48 are effectively out of the circuit and further changes in the voltage at terminals 43 and 44 will appear unattenuated at terminals 17 and 18.

The beam displacement signal appearing at terminals 20 and 21 of the radio convertor unit 19 are limited by diodes 23 and 24 and resistor 22 to control the initial turn angle required to direct an aircraft which is very far off course on the optimum approach path. The limited beam displacement signal appearing at terminals 26 and 27 is algebraically added to the modified heading signal appearing at terminals 17 and 18 in cross pointer meter 28. When the voltage appearing at terminals 17 and 18 exactly equals the voltage appearing at terminals 26 and 27, the vertical pointer 29 of the cross pointer meter 28 will be centered. Should there be a difference in the voltage appearing at terminals 26 and 27 and the voltage appearing at terminals 17 and 18, the pointer 29 will be deflected to the right or to the left depending upon the polarity of the voltages appearing at said terminals. The pointer 29 is arranged to be deflected opposite to the direction of the displacement of the aircraft from the desired flight path.

If desired, the modifying circuit may be disabled so the response of the computor will be linear and follow the "MAG HDG" curve shown in FIG. 3. To accomplish this, disabling switch 60 is connected to shunt the modifying circuit and remove the shunt across resistor 61 to obtain the desired sensitivity. In addition, the radio bearing signals are disconnected from cross-pointer meter 28 and the direct current voltage developed by bridge circuit 14 is applied directly to the cross-pointer meter 28 through resistor 61. Under these conditions, the cross-pointer meter 28 indicates any difference between the desired heading and the actual heading of the aircraft.

While there has been shown and described a preferred embodiment of the invention, it will be understood that many changes and modifications may be made thereto without departing from the scope of the invention.

What is claimed is:

1. In a course director for computing the displacement of the aircraft heading from the heading necessary to navigate the aircraft on a desired course toward and along a radio beam having a definite bearing, a computor for computing a modified heading signal comprising an input for a heading deviation signal corresponding to the displacement of the aircraft heading from the definite bearing of the beam, an output impedance, a control impedance connected between said input and said output impedance sufficiently larger than said output impedance to substantially attenuate output signals at said output impedance, and a pair of Zener diodes connected back-to-back and shunting said control impedance each having a breakdown voltage corresponding to a heading deviation signal for a selected transition angle to proportionately increase output signals at said output impedance for larger heading deviation angles.

2. In a course director for computing the displacement of the aircraft heading from the heading necessary to navigate the aircraft on a desired course toward and along a radio beam having a definite bearing, a computor for computing a modified heading signal comprising an input for a heading deviation signal corresponding to the displacement of the aircraft heading from the definite bearing of the beam, an output impedance, a control impedance connected between said input and said output impedance sufficiently larger than said output impedance to substantially attenuate output signals at said output impedance, a pair of Zener diodes connected back-to-back and shunting said control impedance having a breakdown voltage corresponding to a heading deviation signal for a selected transition angle to proportionately increase output signals at said output impedance for larger heading deviation angles, and a capacitor shunting said control impedance at said diodes to maximize changes in the output signal at said output impedance in response to short period changes in the heading deviation signals.

3. In a course director for computing the displacement of the aircraft heading from the heading necessary to navigate the aircraft on a desired course toward and along a radio beam having a definite bearing, a computor as defined in claim 1 wherein the selected transition angle is about 20°.

4. In a course director for computing the displacement of the aircraft heading from the heading necessary to navigate the aircraft on a desired course toward and along a radio beam having a definite bearing, a computor as defined in claim 2 wherein the selection transition angle is about 20°.

5. In a course director for computing the displacement of the aircraft heading from the heading necessary to navigate the aircraft on a desired course toward and along a radio beam having a definite bearing, a computor as defined in claim 2 wherein said capacitor and said impedances have a time constant of about ten seconds.

6. In a course director for computing the displacement of the aircraft heading from the heading necessary to navigate the aircraft on a desired course toward and along a radio beam having a definite bearing, a computor as defined in claim 4 wherein said capacitor and said impedances have a time constant of about ten seconds.

7. In a course director for computing the displacement of the aircraft heading from the heading necessary to navigate the aircraft on a desired course toward and along a radio beam having a definite bearing, a computor for computing a modified heading signal comprising an input for a heading deviation signal corresponding to the displacement of the aircraft heading from the definite bearing of the beam, an output resistor, a control resistor connected between said input and said output resistor sufficiently larger than said output resistor to substantially attenuate output signals at said output resistor, and a pair of Zener diodes connected back-to-back and shunting said control resistor having a breakdown voltage corresponding to a heading deviation signal for a selected transition angle to proportionately increase output signals at said output resistor for larger heading deviation angles.

8. In a course director for computing the displacement of the aircraft heading from the heading necessary to navigate the aircraft on a desired course toward and along a radio beam having a definite bearing, a computor for computing a modified heading signal comprising an input for a heading deviation signal corresponding to the displacement of the aircraft heading from the definite bearing of the beam, an output resistor, a control resistor connected between said input and said output resistor sufficiently larger than said output resistor to substantially attenuate output signals at said output resistor, a pair of Zener diodes connected back-to-back and shunting said control resistor having a breakdown voltage corresponding to a heading deviation signal for a selected transition angle to proportionately increase output signals at said output resistor for larger heading deviation angles, and a capacitor shunting said control resistor and said diodes to maximize changes in the output signal at said output resistor in response to short period changes in the heading deviation signals.

9. In a course director for computing the displacement of the aircraft heading from the heading necessary to navigate the aircraft on a desired course toward and along a radio beam having a definite bearing, a computor as defined in claim 7 wherein the selected transition angle is about 20°.

10. In a course director for computing the displacement of the aircraft heading from the heading necessary to navigate the aircraft on a desired course toward and along a radio beam having a definite bearing, computer as defined in claim 8 wherein the selected transition angle is about 20°.

11. In a course director for computing the displacement of the aircraft heading from the heading necessary to navigate the aircraft on a desired course toward and along a radio beam having a definite bearing, a computor as defined in claim 8 wherein said capacitor and said resistors have a time constant of about ten seconds.

12. In a course director for computing the displacement of the aircraft heading from the heading necessary to navigate the aircraft on a desired course toward and along a radio beam having a definite bearing, a computor as defined in claim 10 wherein said capacitor and said resistors have a time constant of about ten seconds.

13. In a course director for computing the displacement of a vehicle heading from the heading necessary to navigate the vehicle on a desired course toward and along a radio beam having a definite bearing, a computor for computing a modified heading signal comprising an input for a heading deviation signal corresponding to the displacement of the aircraft heading from the definite bearing of the beam, an output impedance, a control impedance connected between said input and said output impedance sufficiently larger than said output impedance to substantially attenuate output signals at said output impedance, and voltage sensitive means connected across said control impedance effective on an increase of said heading deviation signal in a positive or negative direction above a predetermined amplitude corresponding to a heading deviation signal for selected transition angle to render said control impedance ineffective.

14. In a course director for computing the displacement of a vehicle heading from the heading necessary to navigate the vehicle on a desired course toward and along a radio beam having a difinite bearing, comprising, circuit means for developing a heading deviation voltage having a magnitude and polarity corresponding to the displacement of the vehicle from the desired course, an output impedance for said circuit means, modifying means connected between said output impedance and said circuit means for modifying said heading deviation signal, comprising a control impedance sufficiently larger than said output impedance to substantially attenuate output signals at said output impedance, and voltage sensitive means connected across said control impedance effective on an increase of said heading deviation signal in a positive or negative direction to render said control impedance ineffective to attenuate said heading deviation signal.

15. A course director as claimed in claim 14 wherein said voltage sensitive means comprises a pair of back-to-back Zener diodes connected in shunt across said control impedance.

16. In a course director for computing the displacement of a vehicle heading from the heading necessary to navigate the vehicle on a desired course toward and along a radio beam having a definite bearing, a computor for computing a modified heading signal comprising a bridge circuit for producing a heading deviation signal voltage having an amplitude and polarity corresponding to the displacement of the vehicle from a desired course, an output resistor, a control resistor connecting said output resistor to said bridge circuit, said control resistor having a value considerably larger than said output resistor and effective to attenuate heading deviation voltages corresponding to heading deviation angles below a selected angle, means for rendering said control resistor ineffective for heading deviation signals above said selected angle, means for developing a signal proportional to the angular displacement of the vehicle from the radio beam, and means for algebraically combining the signal developed across said output resistor and the signal proportional to the angular displacement of the vehicle from the radio beam to produce an error signal corresponding to the displacement of the heading of the vehicle from the heading of the vehicle necessary to navigate the vehicle on the desired course.

17. In a course director for computing the displacement of a vehicle heading from the heading necessary to navigate the vehicle on a desired course toward and along a radio beam having a definite bearing, a computor as defined in claim 16, including a capacitor connected in shunt with said control resistor.

18. In a course director for computing the displacement of a vehicle heading from the heading necessary to navigate the vehicle on a desired course toward and along a radio beam having a definite bearing, a computor as defined in claim 16, wherein said means for rendering said control resistor ineffective comprises a Zener diode connected in shunt with said control resistor having a Zener voltage proportional to said selected angle.

19. In a course director for computing the displacement of a vehicle heading from the heading necessary to navigate the vehicle on a desired course toward and along a radio beam having a definite bearing, a computor for computing a modified heading signal comprising, a bridge circuit for producing a heading deviation voltage having an amplitude and polarity corresponding to the displacement of the vehicle from a desired course, an output resistor, a pair of series connected control resistors connecting said output resistor to said bridge circuit, each control resistor being of equal value and considerably larger than said output resistor, and each effective to attenuate heading deviation voltages corresponding to heading deviation angles below a selected angle, a pair of Zener diodes connected in shunt with said control resistors, respectively, and back-to-back with each other, each of said Zener diodes having a Zener voltage proportional to said selected angle, for rendering said control resistors ineffective for heading deviation signals above said selected angle, means for developing a signal proportional to the angular displacement of the vehicle from the radio beam, and means for algebraically combining the signal developed across said output resistor and the signal proportional to the angular displacement of the vehicle from the radio beam to produce an error signal corresponding to the displacement of the heading of the vehicle from the heading of the vehicle necessary to navigate the vehicle on the desired course.

No references cited.